United States Patent
Huelle et al.

[11] Patent Number: 4,475,686
[45] Date of Patent: Oct. 9, 1984

[54] VALVE FOR LIQUID INJECTION INTO A REFRIGERANT EVAPORATOR

[75] Inventors: Zbigniew R. Huelle, Sonderborg; Leif Nielsen, Nordborg; Jakob S. Jakobsen, Sonderborg, all of Denmark

[73] Assignee: Danfoss A/S, Nordborg, Denmark

[21] Appl. No.: 553,799

[22] Filed: Nov. 21, 1983

Related U.S. Application Data

[60] Division of Ser. No. 448,188, Dec. 9, 1982, abandoned, which is a division of Ser. No. 272,731, Jun. 11, 1981, abandoned, which is a continuation of Ser. No. 956,859, Nov. 1, 1978, abandoned.

[30] Foreign Application Priority Data

Nov. 3, 1977 [DE] Fed. Rep. of Germany ....... 2749250

[51] Int. Cl.³ ............ F25B 41/04; G05D 23/00; F16K 31/00
[52] U.S. Cl. ............ 236/68 C; 236/80 G; 62/212; 62/225; 251/11
[58] Field of Search ............ 236/68 R, 68 A, 68 C, 236/80 R, 80 F, 80 G; 251/11, 25, 28, 43, 44, 251, 45, 63, 63.5; 62/210, 211, 212, 222, 224, 225

[56] References Cited

U.S. PATENT DOCUMENTS

| | | | |
|---|---|---|---|
| 1,905,683 | 4/1933 | Carraway | 236/80 G |
| 2,534,455 | 12/1950 | Koontz | 62/225 X |
| 3,265,303 | 8/1966 | Harris | 236/80 G |
| 3,279,778 | 10/1966 | Jespersen | 62/225 X |
| 3,500,634 | 3/1970 | Waseleski, Jr. et al. | 236/68 C X |
| 3,664,581 | 5/1972 | Stannow | 62/222 X |
| 3,860,169 | 1/1975 | Norman | 236/68 C |
| 4,171,087 | 10/1979 | Kunz | 236/68 R |

Primary Examiner—Harry Tanner
Attorney, Agent, or Firm—Wayne B. Easton

[57] ABSTRACT

The invention relates to a valve assembly for a refrigeration plant of the kind used for controlling the flow of refrigerant from the evaporator to the compressor. The closure member for the valve unit is controlled directly or indirectly by a movable wall of an expansible chamber filled with a refrigerant medium having vapor and liquid phases. The pressure exerted by the vapor phase of the medium provides a bias in a valve opening direction which is directly related to the temperature of the liquid phase and is opposed by a spring bias in the valve closing direction. A heat transfer element such as a heating resistor in the liquid phase is heated or allowed to cool in a controlled manner by an external control unit. A temperature responsive sensor element in the liquid phase of the medium is part of a feedback system for the control unit which allows a selected temperature to be maintained in the chamber which results in a desired constant pressure in a valve opening direction to be maintained in a chamber. A control unit has an evaporator parameter input branch and a second input branch for the feedback temperature sensing element. The control unit has an output for heating the heating resistor in the expansible chamber and a summating section for varying the relative effects of the input branches on the output.

2 Claims, 6 Drawing Figures

VALVE FOR LIQUID INJECTION INTO A REFRIGERANT EVAPORATOR

This application is a division of application Ser. No. 448,188, filed Dec. 9, 1982 abandoned, which was a division of application Ser. No. 272,731, filed June 11, 1981 abandoned, which was a continuation of application Ser. No. 956,859, filed Nov. 1, 1978 abandoned.

The invention relates to a valve for liquid injection into a refrigerant evaporator, of which the closure member assumes a condition of equilibrium in response to a continuously variable vapour pressure of a medium that acts on a displaceable first pressure face closing a pressure vessel and that depends on one parameter of the evaporator, and in response to a spring which acts in the opposite direction, possibly also the evaporator pressure acting on a second pressure face.

A thermostatic expansion valve is known which comprises a sensor partially filled with a vapour-forming liquid. The sensor is applied to the evaporator outlet at the end of the superheating path. Consequently a vapour pressure occurs in the sensor that corresponds to the measured temperature. This vapour pressure also acts in the pressure vessel that is applied to the valve arranged at the evaporator inlet and thus on the first pressure face which can be in the form of a diaphragm or the base of bellows. On the other side, an adjustable spring and the evaporator pressure are active.

In such an expansion valve, the amount of static superheating, i.e. that temperature difference at which the valve commences to open, is not with the aid of the spring. However, adaptation of the superheating can be undertaken only in situ. If one wants to obtain a different characteristic opening curve, i.e. particularly a characteristic curve with a different inclination, the injection nozzle with the valve seat must be changed and this involves either replacement of the entire valve or at least the nozzle insert.

It is also known to provide a thermostatic level regulator for refrigeration plant, wherein a sensor inserted in the collector of a flooded evaporator comprises a heating member which heats a vapour-forming liquid. If the sensor is wetted by the liquid refrigerant, a considerable amount of heat is dissipated. As a result, two different vapour pressures occur in the sensor and thus in the pressure vessel of the thermostatic valve depending on the filling height. This, however, only permits a two-point control.

Further, a thermohydraulic valve is known for heating installations or the like, wherein an expansion chamber filled with an expansion fluid is closed on one side by a piston connected to the shank of the valve. Heating and/or cooling elements dip into the fluid and are provided with energy from a room thermostat by way of a control unit to influence the temperature and thus the volume of the expansion fluid. The temperature of the expansion fluid is measured by a temperature sensor and reported back to the control unit. Resetting of the valve takes place by means of a spring.

The invention is based on the problem of providing a valve of the aforementioned kind which permits a much freer adaptation to different operating conditions.

This problem is solved according to the invention in that the pressure vessel is associated with heating means supplied with current from a control unit so as to fix the vapour pressure and with a temperature sensor to report back the temperature responsible for the vapour pressure, that the medium is selected so that at a vapour pressure bringing about equilibrium its temperature is higher than the temperature of the refrigerant in the valve and/or of the surrounding air, and that the control device comprises means for changing the functional relationship between the one evaporator parameter and the vapour pressure in the pressure vessel.

Whereas there is a fixed functional relationship between the vapour pressure and the measured temperature in the case of the known continuously adjustable thermostatic valves with liquid/vapour filling, with an intermediate control unit it is possible to achieve a functional relationship between the measured temperature and the vapour pressure in the pressure vessel that is more suitable for a particular application. This gives numerous possibilities of changing the characteristic curve of the valve, whether it be its inclination or the static superheating. It is also possible to control the valve in response to more than the one evaporator parameter, thereby presenting entirely new regulating possibilities, particularly those which lead to an optimum filling of the evaporator. Further possibilities reside in changing the influence of the feedback temperature sensor in the pressure vessel, changing the width of the proportional range of the regulating circuit, and the like. What is important is that all these expedients can be remote controlled and that the distance between the valve and the associated sensor can be selected entirely at will whereas it was hitherto limited by the permissible length of the capillary tube.

Considerable advantages are achieved in manufacture in that a single valve type in conjunction with a control unit is suitable for a much larger number of applications than hitherto, e.g. in that one and the same nozzle size can be used for a larger load range or one and the same valve can be used for several different refrigerants. It is also possible to use one and the same pressure vessel for different valves. On the whole, one obtains higher production figures and a lower stock requirement.

Desirably, the temperature of the medium in the operating range is 25° to 45° C., preferably 30° to 40° C., higher than the refrigerant temperature. In particular, it should also be somewhat higher than the ambient temperature. This results in a high speed of reaction. The supplied amount of heat is nevertheless no higher than is absolutely necessary. The speedy reaction can be still further increased in that the pressure vessel is connected to the valve housing by a metallic thermally conductive bridge. Further, the pressure vessel may be provided with cooling ribs on the outside.

The heating means may be formed by a helix of resistor wire. This wire has a comparatively large surface for the dissipation of heat. Alternatively, or in addition, a PTC resistor member may be used. This has the advantage of automatically limiting the current when the supply of power is excessive. Further, one can also use a power transistor which heats the medium by its less heating. Further possibilities reside in arranging a high frequency coil about the pressure vessel and heating the medium inductively. In the case of an electrically conductive medium, one can also use heating means in the form of two electrodes loaded by a variable A.C. current.

In a similar manner, instead of the heating means one can also use cooling means, e.g. a Peltier element of which the cold soldered point is disposed in the pressure vessel. It must then be ensured that the temperature of the medium in the pressure vessel is lower than the temperature of the refrigerant or the surrounding air. In this connection it is again recommended to have a thermally conductive bridge to the valve and/or external ribs on the pressure vessel.

In a preferred embodiment, the medium has a liquid and a vapour phase, the liquid phase is also located in the pressure vessel, and the heating or cooling means and the feedback temperature sensor are disposed entirely in the liquid phase. The temperature at the surface of the liquid is then that responsible for the vapour pressure, irrespective of the size of the vapour chamber. By arranging the components in the liquid, one obtains a better heat transfer.

Further, the pressure vessel can be considerably more than half-filled with the liquid phase, particularly by about 70%. In this way it is possible to arrange the valve at any desired position, the heating or cooling means and the temperature sensor always being disposed within the liquid phase if they are arranged substantially in the middle. By way of example, a pressure vessel with a volume of about 20 to 25 cm$^3$ is suitable. In particular, it may be substantially spherical.

The medium can also have a solid adsorbent and a gaseous adsorbate. With such an adsorption filling, the gas is driven out of the adsorbent in response to the temperature. Here, again, the vapour pressure depends substantially only on the temperature.

An NTC resistor or a thermo-element is recommended as the feedback temperature sensor. This brings about a feedback connection for the control unit so that disruptive influences from the refrigerant or the surrounding air can be rapidly taken into account.

With particular advantage, the base-emitter path of the power transistor is used as the feedback temperature sensor because in that case the heating means and temperature sensor can be combined as a single element. This results in simpler assembly, still more reliable measurement of the temperature and also a safeguard against the excessive supply of energy.

In one embodiment, the pressure vessel comprises a multi-polar duct, the temperature sensor being connected to the first pole and second pole and the heating resistor being connected to the third pole and fourth pole or to the body of the pressure vessel. In particular, the multi-polar duct may comprise plug-in pins which, insulated by an insulating material such as glass, pass through a dished cover of the pressure vessel. This results in simple assembly because all the components can be secured to those plug pins and the cover then welded to the wall of the pressure vessel.

In a preferred embodiment, the control unit is connected to an outer temperature sensor which is applied to the evaporator outlet and gives an electric signal which changes continuously with a change in temperature. This signal can then be directly electrically processed in the control unit.

Further, the control unit may comprise an adjustable resistor with which the starting point of the characteristic opening curve of the valve is displaceable. Further, it can comprise an adjustable resistor with which the inclination of the characteristic opening curve of the valve is variable. This already provides countless possibilities of adaptation.

With particular advantage, the control unit is connected to a second outer temperature sensor disposed at the evaporator inlet. When the temperature difference between these two sensors is evaluated in the control unit, no evaporator pressure need act on the second pressure face; one can therefore dispense with a corresponding conduit which supplies this evaporator pressure.

Further, the first outer temperature sensor may be disposed at the end and a further outer temperature sensor, which gives a feedback signal, at the start of the superheating path at the evaporator outlet. In this way any liquid at the evaporator outlet is detected sooner. Any hunting can be damped by means of feedback.

In addition, the control unit may be connected to at least one liquid/vapour sensor disposed in the suction gas conduit at the evaporator outlet. Preferably, this is done in that at the start of the superheating path there is a first and at the other end a second liquid/vapour sensor, with a temperature sensor therebetween, the second sensor being disposed in an outlet tube behind the evaporator and giving a different signal for wet vapour than for superheated vapour.

Conventional resistance sensors, e.g. Ni or Pt sensors, or thermo-elements can be used for the outer temperature sensor. For use in the suction tube, NTC resistors and small Ni sensors are suitable.

In the case of flooded evaporators, it is desirable for the control unit to be connected to a level sensor which measures the liquid level in the evaporator and gives an electric signal which changes continuously with a change in liquid level. In this way, the open position of the valve can be set as a function of the liquid height.

Further, the control unit may be connected to a position sensor which detects the position of the closure member of the valve and gives an electric signal which changes continuously with a change in position. In this way one obtains a feedback which stabilizes the regulation.

The level sensor and position sensor may be identically constructed in relation to the signal generator. For example, a potentiometer may be adjusted, there may be self-induction or the like.

In a preferred embodiment, it is ensured that the pressure vessel forms a unit with an upper portion of the valve housing and is releasably connected to a lower valve housing portion having an exchangeable valve seat insert. In this way one and the same pressure vessel can be combined with different valve seat inserts or nozzle inserts or with different lower portions of the valve housing.

It is also possible for the pressure vessel to have a screwthread below the diaphragm for the purpose of connection to the valve housing. Again, in this way one can use one and the same pressure vessel in conjunction with different valves. All this results in considerable advantages in rationalisation.

With advantage, the valve serves as a pilot valve for a main valve. In this case it can be mounted on the cover of the main valve, pilot passages being provided in the housing and in the cover of the main valve.

The control unit may have any desired construction. However, it is particularly advisable to have a control unit with the following components:

(a) a first bridge circuit with an outer temperature-sensing resistor and a potentiometer, as well as a first amplifier which is energised by the diagonal voltage thereof by way of an adjustable resistor, (b) a second bridge circuit with a feedback temperature-sensing resistor and an adjusting potentiometer, as well as a second amplifier energised by the diagonal voltage thereof, (c) a summating circuit which has two adjustable resistors and in which the output signals of the first and second amplifier are added, and (d) a third amplifier energised thereby and having a downstream current regulator in series with the heating or cooling means.

The stated possibilities of adjustment permits adaptation to the most important regulating problems to be achieved. It is also possible to scan other positions so as to take additional viewpoints into consideration.

The invention will now be described in more detail with reference to examples illustrated in the drawing, wherein.

Figure 1:
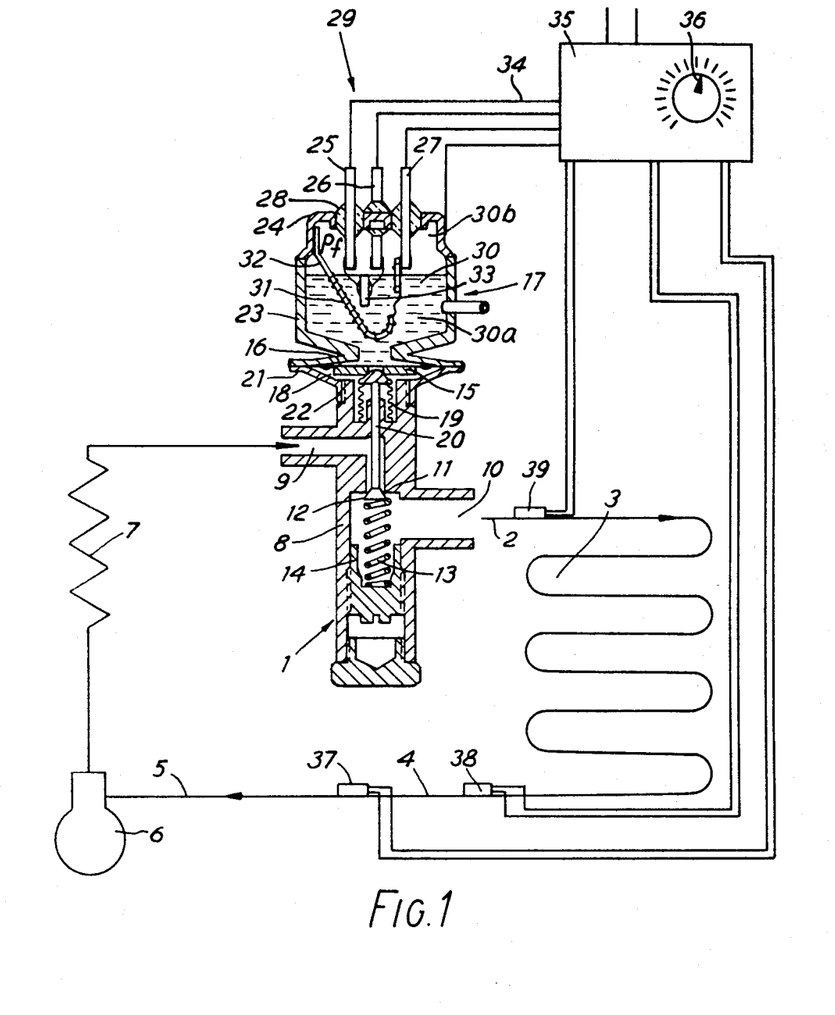
FIG. 1 shows a thermostatic expansion valve according to the invention with a control unit and associated sensors for a forced-flow evaporator.

A thermostatic expansion valve 1 is disposed at the inlet 2 of an evaporator 3 of a refrigeration plant, the outlet being formed by a superheating path 4 which is connected to a compressor 6 by way of a suction conduit 5. The compressor leads to the expansion valve again by way of a condenser 7.

This valve comprises a housing 8 with an inlet chamber 9 and an outlet chamber 10 between which there is a valve seat 11 which is also termed a nozzle. The associated closure member 12 is on the one hand under the influence of a spring 13 which is adjustable with the aid of a screwthreaded plug 14 and is on the other hand supported by a diaphragm 16 with an interposed pressure plate 15, the diaphragm being loaded by the vapour pressure $p_f$ in a pressure vessel 17. The chamber 18 beneath the diaphragm is provided with a bellows element 19 which closes the valve shank 20 in such a way that the condenser pressure has no influence on the function of the valve.

The pressure vessel 17 is made in one piece with the diaphragm 16 and a flange 21 having a screwthread 22. It can therefore be screwed off the valve housing 8 and onto a different valve housing. The pressure vessel 17 comprises a capsule 23 closed at the top by a cup 24. The latter is penetrated by three pins 25, 26, and 27 held in apertures of the cup by means of glass insulation 28, thereby resulting in an electric duct 29. In the pressure vessel 17 there is a two-phase medium 30 having a liquid phase 30a and a vapour phase 30b. In the liquid phase there is a heating resistor 31 in the form of a heating coil which is held by wire carriers 32. The liquid phase also contains an NTC resistor 33 which serves as a feedback temperature sensor. This sensor is connected to the pins 25 and 26 and the heating resistor 31 is connected to the pin 27 and the body of the pressure vessel 17.

The body and pins are connected by way of four conductors 34 to a control unit 35 which has a rotary knob 36 to set the desired value. Three outer temperature sensors are also connected to the control unit. One sensor 37 is disposed at the end and a further sensor 38 at the start of the superheating path 4. Yet another sensor 39 is provided at the inlet of the evaporator. This enables the following manner of operation to be achieved: The difference between the temperatures measured by the sensors 37 and 39 is an accurate measurement of the superheating temperature. With the aid of the control unit 35, the temperature of the filling 30, and thus the vapour pressure $p_f$, is kept at such a value by heating the heating resistor 31 that the expansion valve 1 assumes an open position at which the desired superheating temperature is kept substantially constant. By reason of the sensor 38, upon a sudden requirement of refrigerant and a corresponding opening of the valve 1, the closing step already commences when this sensor 38 is cooled because on commencement of the superheating path 4 the refrigerant vapour still carries liquid refrigerant droplets with it. To adapt to different valve sizes, different positions of installation and different refrigerants, various settings can be made at the control unit 35, to which reference will be made in conjunction with FIGS. 5 and 6. What is particularly important in this connection is that it is unnecessary to load the diaphragm 16 by vapour pressure from below because the sensor 39 has a similar influence.

Figure 2:
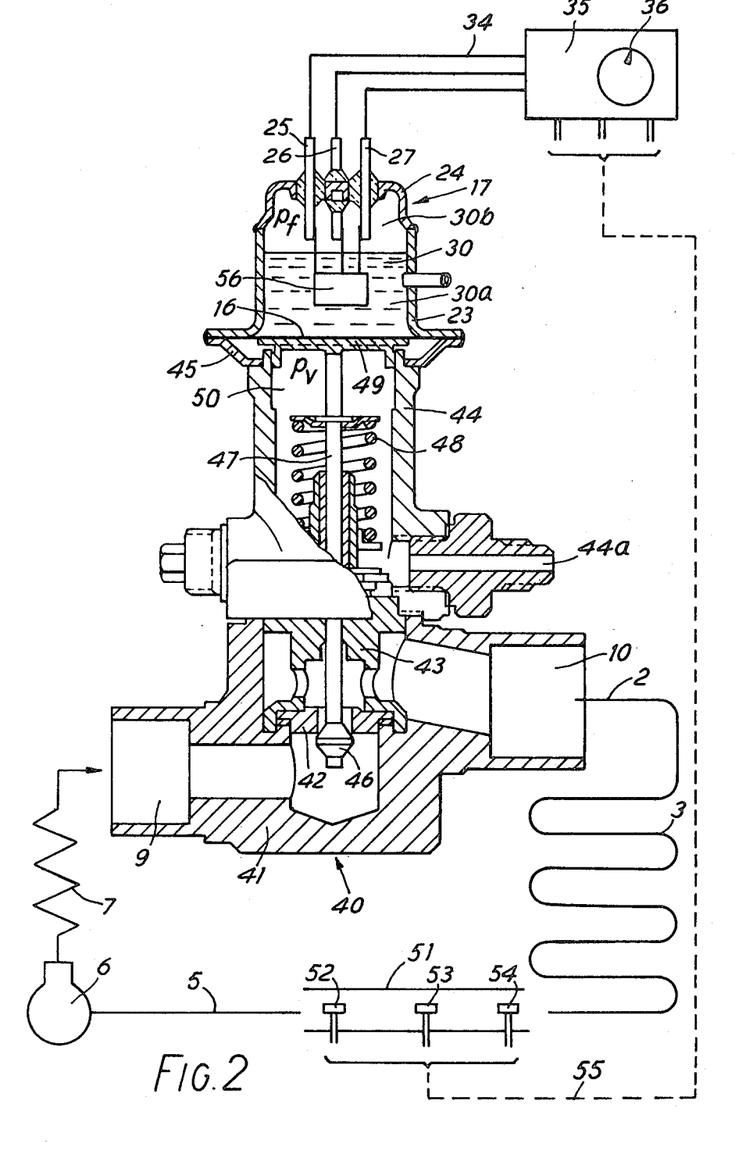
FIG. 2 shows a modified embodiment of a valve according to the invention.

FIG. 2 shows a modified embodiment in which corresponding parts are provided with the same reference numerals as in FIG. 1. The thermostatic expansion valve 40 comprises a housing with a lower portion 41 having inserted therein a nozzle insert 43 carrying the valve seat 42 and secured by means of an upper portion 44 of the housing. By means of a flange 45, the pressure vessel 17 is connected to the upper portion of the housing as one piece. Such an upper portion can thus be utilised for different nozzle inserts 43 and different lower portions 41 of the housing. The closure member 46 comprises a shank 47 which is under the influence of a spring 48 and, with the interpositioning of a pressure shoe 49 lies against the diaphragm 16. The latter is under the vapour pressure $p_f$ in the vessel 17 at the top whereas at the bottom it is under the pressure $p_v$ in the chamber 50 which is connected to the evaporator by a connector 44a.

The evaporator outlet is formed by a tube 51 in which there are three sensors 52, 53 and 54 connected to the control unit 35 by a connecting line 55. The sensors 52 and 54 have a true two-point behaviour and detect whether the refrigerant is superheated or wet. The sensor 53 determines the temperature of the refrigerant. The results of measurement and the settings in the control unit 35 permits a vapour pressure $p_f$ to be produced for each operating condition that results in an optimum filling of the evaporator 3.

In this embodiment, the liquid phase 30a contains a power transistor 56 which is so energised with current that its power loss heats the filling 30. At the same time, the voltage drop at the base-emitter path of this transistor serves as a temperature sensor because this voltage drop changes for example at 0.02 V/°C. in the case of a silicon transistor.

Figure 3:
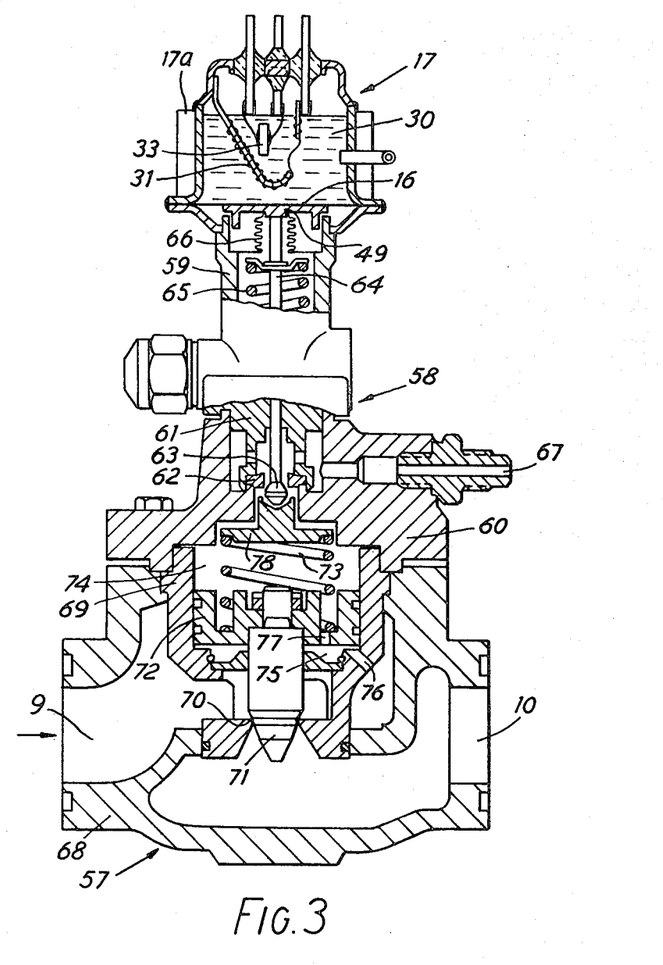
FIG. 3 shows a valve according to the invention as the pilot valve for a servo-controlled main valve of a forced-flow evaporator.

In the FIG. 3 embodiment, a servo-controlled main valve 57 is controlled by a pilot valve 58 constructed in accordance with the invention, it being for example possible to insert this arrangement instead of the valve 1 in FIG. 1 in a refrigeration plant. The pressure vessel 17 forms a unit with the upper portion 59 of the housing of the pilot valve 58. Between this upper portion and a lower portion 60 there is a nozzle insert 61 which carries a valve seat 62 for the closure member 63. The associated valve shank 64 is under the bias of a spring 65, is enclosed at the top by bellows 66 and lies against the diaphragm 16 with a pressure shoe 46 being interposed. A connector 67 connects the output of the pilot valve to the evaporator.

The main valve 57 comprises a housing 68 which is covered at the top by the lower portion 60 of the housing of the pilot valve 58 and comprises a nozzle insert 69 with a valve seat 70 for a closure member 71. The latter is connected to a piston 72 which is biassed by a spring 73 and under the influence of the pressure difference between the chambers 74 and 75. The chamber 75 communicates with the inlet chamber 9 by way of a throttle 76 and with the chamber 74 by way of a further throttle 77. The chamber 74 at the same time forms the inlet chamber for the pilot valve. A supporting plate 78 is disposed between the spring 73 and the closure member 63.

When the closure member 63 has been given a certain position by a predetermined vapour pressure $p_f$ in the pressure vessel 17, refrigerant flows by way of the throttling positions 76, 77 and the valve seat 62 of the pilot valve 58 into the evaporator. The amount of refrigerant and hence the pressure drop at the throttle 77 depends on the opening of the pilot valve. The piston 72 assumes a position of equilibrium in which this pressure drop multiplied by the piston area corresponds to the force of the spring 73. The main valve 57 is therefore made to follow the pilot valve 58.

The outside of the pressure vessel 17 is provided with cooling ribs 17a. For the purpose of cooling, heat can therefore be dissipated not only to the pilot valve 58 by way of the thermal bridge but also to the surrounding air.

Figure 4:
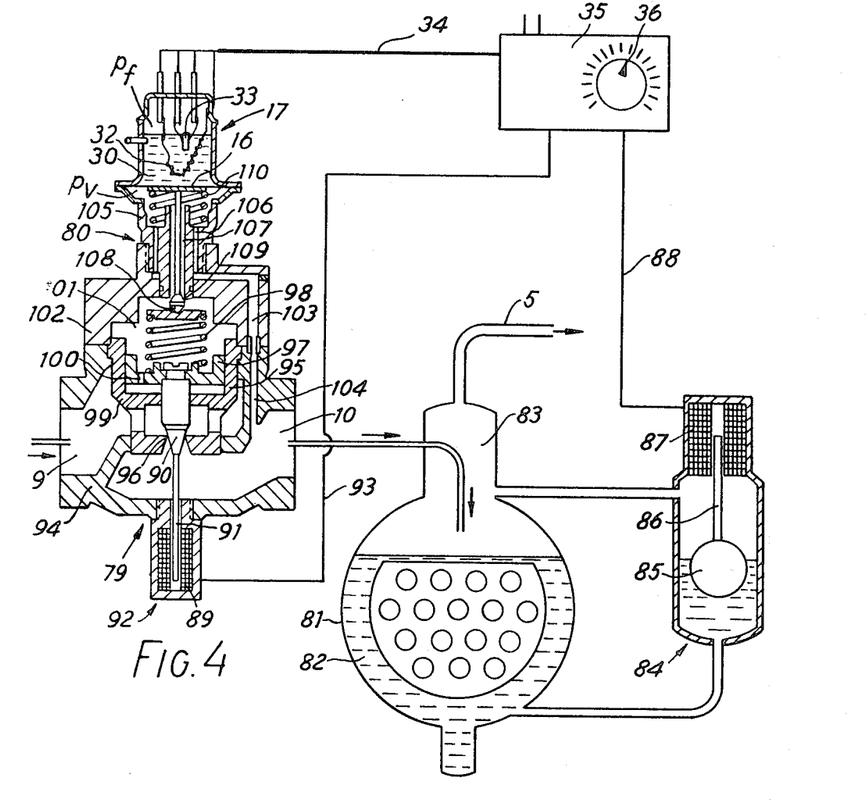
FIG. 4 shows a valve according to the invention as the pilot valve for a servo-controlled main valve of a flooded evaporator.

In the FIG. 4 embodiment, a servo-controlled main valve 79 is provided with a pilot valve 80 for feeding a flooded evaporator 81. The liquid chamber 82 as well as the vapour chamber 83 are connected by way of a respective conduit to a level sensor 84 which has a float 85 with an armature 86. The latter engages in a signal generator 87 in the form of a magnetic coil connected by a line 88 to the control unit 35. A similar signal generator 89 is actuated by an armature 91 connected to the closure member 90 of the main valve 79. It serves as a positioner 92 and is connected to the control unit 35 by a line 93. In other respects, the main valve 79 is of very similar construction to the main valve 57. Thus, there is a housing 94, a nozzle insert 95 with valve seat 96, a piston 97, a spring 98 and two throttling positions 99 and 100. The chamber 101 above the piston is at the same time the inlet chamber of the pilot valve 80. It is closed by a cover 102 in which there is a pilot passage 103 connected by way of a pilot passage 104 in the valve housing 94 to the output chamber 10.

In the housing 105 of the pilot valve which can be screwed into the cover 102 there are eccentric passages and a central passage 107 which in penetrated by the valve shank. The closer member 108 co-operates with a valve seat 109. A spring 110 biasses the valve shank.

In this arrangement the main valve again follows changes in the pilot valve. The latter is displaced in response to the vapour pressure $p_f$ in the vessel 17, the evaporator pressure $p_v$ beneath the diaphragm 16 and the spring 110. Altogether, there are several feedbacks in the sense of a cascade control. Firstly, the spring 98 forms a feedback spring between the piston 97 of the main valve 79 and the closure member 108 of the pilot valve 80. Next, the position sensor 92 gives a position signal and the level sensor 84 a filling signal to the control unit 35. Finally, there is a third feedback with the aid of the temperature sensor 33 which compensates disturbances caused by the ambient temperature or changed cooling conditions as a result of the refrigerant flowing through the valve.

Figure 5:
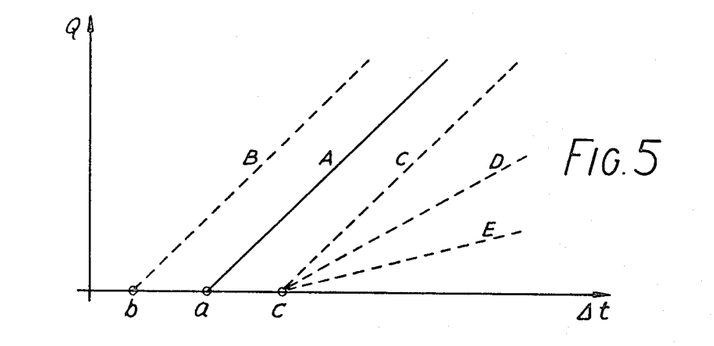
FIG. 5 are valve curves for the operation of a forced-flow evaporator.

If, for simplicity, one assumes in the FIG. 1 embodiment that only the sensors 37 and 39 are provided, then one can enter valve curves in which the amount of throughflow Q is shown against the superheating temperature $\Delta t$. For a particular setting, one obtains a characteristic curve A with a predetermined static superheating a. By means of adjustment at the control unit 35, this static superheating can be reduced (b) or increased (c), thereby resulting in displaced parallel characteristic curves B or C.

In addition, the control unit 35 can also be used to change the inclination of the characteristic curves so as to produce the curves D and E. Obviously the static superheating and the inclination of the characteristic curve can be changed simultaneously.

Figure 6:
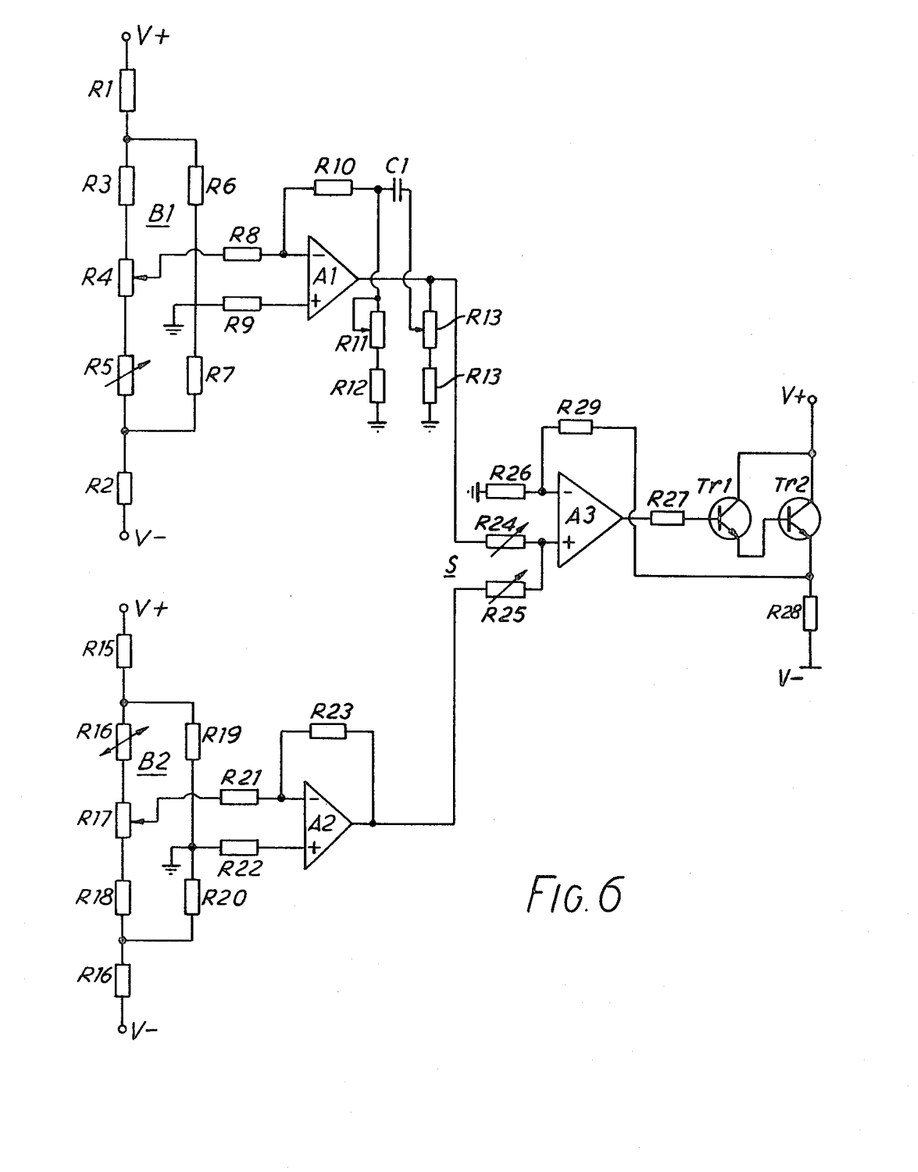
FIG. 6 shows one embodiment of a circuit for the control unit.

An example of a circuit for the control unit of FIG. 1 is shown in FIG. 6. A first bridge B1 is applied between the terminals V+ and V− for the positive and negative voltage by using series resistors R1 and R2. In its one branch, the bridge comprises a temperature-responsive resistor R3 corresponding to the sensor 39, a potentiometer R4 serving to set the static superheating, and a temperature responsive resistor R5 which corresponds to the sensor 37. The other branch consists of two fixed resistors R6 and R7 which fix the earthed reference point of the bridge B1. The two diagonal voltages are applied to the two inputs of the first amplifier A1 by way of a respective resistor R8 and R9. The resistor R8 is adjustable so as to change the amplification factor and thus the inclination of the characteristic curve. The inverting input is connected to the earthed reference point by way of a resistor R10, an adjustable resistor R11 and a fixed resistor R12. Between these resistors R10 and R11 there is a branch series circuit of a condensor C1, an adjustable resistor R13 and a fixed resistor R14, likewise leading to the earthed reference point.

A second bridge B2 is disposed between the voltage sources V+ and V− by using series resistors R15 and R16. In one branch it comprises a temperature responsive resistor R16 corresponding to the sensing resistor 33, a potentiometer R17 by which adjustment is possible, and a fixed resistor R18. The other branch consists of two resistors R19 and R20 between which there is an earthed reference point. The diagonal points are connected by way of the resistors R21 and R22 to the inputs of a second amplifier A2 which is provided with a feedback resistor R23.

In a summating circuit S comprising two adjustable resistors R24 and R25, the output signals of the two amplifiers A1 and A2 are fed to a third amplifiers A3 of which the other input is connected to the earthed reference point by way of a resistor R26. The output of this amplifier is connected by way of a resistor R27 to a transistor amplifier consisting of two transistors Tr1 and Tr2 which are in a Darlington connection. A heating resistor R28 corresponding to the resistor 31 is in series with the collector-emitter path of the transistor Tr2. The emitter potential is fed back to the inverting input of the amplifier A3 by way of a resistor R29.

This circuit permits a proportional power amplification to be obtained of the voltages from the two operational amplifiers A1 and A2 added at the non-inverting input of the amplifier A3. With the aid of the adjustable resistors R24 and R25 it is possible to take the influences of the two bridges B1 and B2 into account with different emphasis. With the aid of the resistors R11 and R13 one can set the proportionality factor and the integration constant at the amplifier A1. Altogether, one can in this way obtain a regulation in which the integration condenser C1 need not assume very large values.

The rotary knob 36 can be associated with the potentiometer R4. A second rotary knob may be provided for the adjustable resistor R8. Again, appropriate adjusting knobs can be provided for changing the regulator constants with the resistors R11 and R13 but it is also possible to effect this adjustment automatically in the sense of an adaptive regulation. Only slight modifications are necessary if a thermo-element is used as the temperature sensor 33 or if the heating resistor 31 is replaced by a power transistor 56. Again, if cooling means are used instead of heating means, only slight changes are required to be made to the entire circuit. The same applies if for the purpose of influencing the control behaviour further sensors are provided which act in the same sense as the resistors R11 and R13.

What is claimed is:

1. A valve assembly for a refrigerator plant having an evaporator that includes an outlet tube, comprising a valve unit that includes a lower first portion having an inlet first chamber, an outlet second chamber and an opening between the inlet and outlet chambers, closing means for closing said opening, said closing means including a nozzle insert having a valve seat that is in said lower portion, a closure member abuttable against the valve seat for blocking fluid flow between the inlet and outlet chambers, means for biasing said closing means, including the closure member, in a valve closing direction, a second portion joined to the lower portion that in part defines a third chamber with the closing means extending therethrough, a connector mounted by the second portion to open to the third chamber for being fluidly connected to the evaporator, chamber means mounted on said second portion and having a moveable wall portion in abutting relationship with said closing means, a filling medium for the chamber means that has a liquid and vapor phase exerting a pressure $P_f$ biasing said wall portion in a valve opening direction, a control unit for controlling the temperature of said filling medium, and heating and feedback temperature sensing means in said chamber means that is connected to said control unit, said third chamber opening to said movable wall portion and said biasing means including resilient means for biasing said closure member against said movable wall portion, and a pair of sensor means connected to said control unit for detecting whether or not the refrigerant in the evaporator outlet tube is superheated and sensor means connected to said control unit for determining the temperature of the refrigerant in said evaporator outlet tube.

2. A valve assembly for a refrigerator plant having an evaporator that includes an outlet tube, comprising a valve unit that includes a lower first portion having an inlet first chamber, an outlet second chamber and an opening between the inlet and outlet chambers, closing means for closing said opening, said closing means including a nozzle insert having a valve seat that is in said lower portion, a closure member abuttable against the valve seat for blocking fluid flow between the inlet and outlet chambers, means for biasing said closing means, including the closure member, in a valve closing direction, a second portion joined to the lower portion that in part defines a third chamber with the closing means extending therethrough, a connector mounted by the second portion to open to the third chamber for being fluidly connected to the evaporator, chamber means mounted on said second portion and having a movable wall portion in abutting relationship with said closing means, a filling medium for the chamber means that has a liquid and vapor phase exerting a pressure $P_f$ biasing said wall portion in a valve opening direction, a control unit for controlling the temperature of said filling medium, and heating and feedback temperature sensing means in said chamber means that is connected to said control unit, said valve unit including means that in part defines a fourth chamber that is disposed between said inlet chamber and said third chamber and has a throttle passage for conducting fluid between said inlet chamber and said fourth chamber, said biasing means including a piston that in part defines a fifth chamber between said fourth and third chambers and has a throttle passage for conducting fluid between said fourth and fifth chambers, means for biasing said piston in a valve closing direction, said closure member being mounted by the piston, said second portion including a second valve seat between said third and fifth chambers, and said first mentioned biasing means including a second closure member abuttable against said movable wall portion for being biased thereby in a direction away from said second valve seat to permit fluid flow between said third and fifth chambers, resilient means for biasing said second closure member toward said second valve seat for blocking fluid flow between said third and fifth chambers, said means for biasing said piston including a support plate abuttable against said second closure member to be moved thereby toward said piston when said second closure member moves away from said second valve seat, and a spring between said support plate and said piston for biasing said piston and thereby said first closure member in its valve closing direction.

* * * * *